United States Patent Office 3,051,898
Patented Aug. 28, 1962

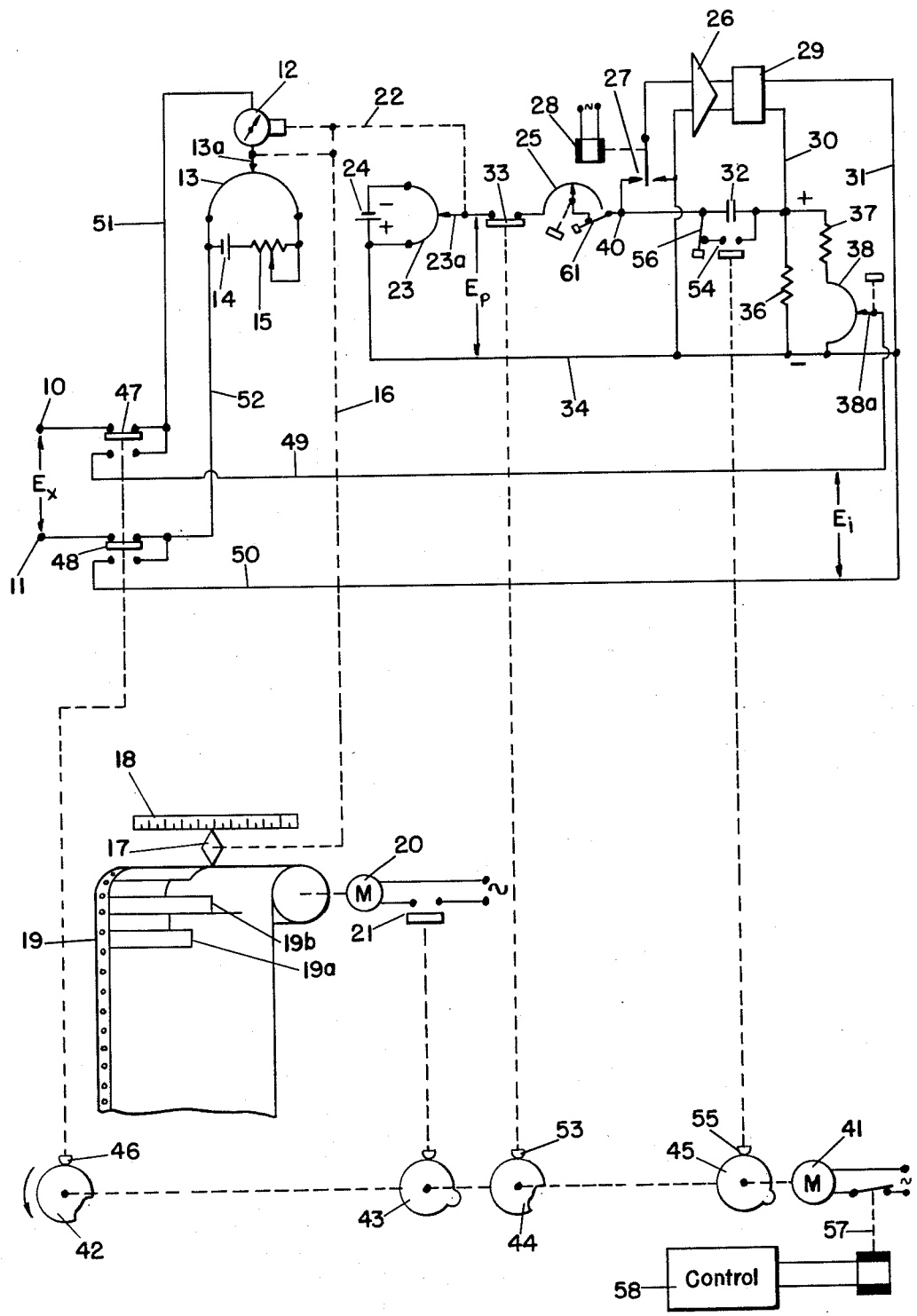

3,051,898
MEASURING AND INTEGRATING SYSTEM
James U. Eynon, Willow Grove, Pa., assignor to Leeds and Northrup Company, Philadelphia, Pa., a corporation of Pennsylvania
Filed Sept. 28, 1959, Ser. No. 842,879
17 Claims. (Cl. 324—100)

This invention relates to measuring and integrating systems and has for an object the provision of such a system which is reliable in operation and which performs the required multiple functions of measuring and integrating with a minimum of components.

In many industrial processes it is frequently desirable to integrate with respect to time the magnitude of a condition or a measured variable and to produce an indication and/or a record of the integrated magitude of such a condition. In order to integrate the magnitude of a condition, there must be provided a measuring system arranged to produce a measured output of magnitude at all times proportional to that of the condition. This measured output is then applied to an integrating means for producing a second output proportional to the integral with respect to time of the measured output.

In accordance with the present invention, the measuring system which is utilized to produce the measured output proportional to the magnitude of the condition is likewise utilized for measuring the second output proportional to the integral of the first output. This is accomplished by providing a means of disconnecting the integrating means from the measuring system and for then applying the second output as the input to that measuring system for producing therefrom an indication of the magnitude of the integral with respect to time of the magnitude of the condition. Thus the system as a whole operates periodically to measure and to integrate the magnitude of a condition and periodically to provide indications and/or records of the integral with respect to time of the magnitude of the condition.

In a preferred form of the invention there is utilized a measuring circuit for producing a voltage output proportional to the magnitude of the condition. This voltage output is applied to an integrating system including an amplifier, an integrating capacitor, and an integrating resistor. The arrangement is such that the magnitude of the charge on the capacitor is proportional to the integral with respect to time of the voltage representative of the magnitude of the condition. Periodically the integrating system, having a voltage output representative of the charge on the integrating capacitor, is disconnected from the measuring circuit. This output is then applied to the input of the measuring circuit, which input is then disconnected from the condition under measurement, for measurement of the output, and thus the integral with respect to time of the magnitude of the condition over the preceding time interval. Preferably, the measuring system includes an exhibiting means for indicating not only instantaneous variations in the magnitude of the condition, but also for indicating and recording the aforesaid integral with respect to time of that condition.

For further objects and advantages of the invention and for a discussion of a typical embodiment thereof, reference is to be had to the following description taken in conjunction with the accompanying drawing in which there has been diagrammatically illustrated a system embodying the invention.

Referring to the drawing, there is applied to input terminals 10 and 11 a voltage $E_x$ representative of, that is proportional to, the magnitude of a condition to be measured and integrated values of which are desired.

Though as indicated above, there are many conditions where there may be desired measurements of the magnitudes as well as the determination of quantities representative of integrals of such conditions, reference may be had to gas chromatography as one field where such measurements are particularly useful. For example, it has been found that with gas chromatograms a better correlation with concentration is achieved if area measurements beneath peak values are utilized instead of measurements alone of the peak heights of the output of the chromatograph detector. Thus it may be assumed that the voltage $E_x$ is that produced by the detector in a gas chromatograph.

The magnitude of the voltage $E_x$ is determined by a measuring system which includes a detector 12 and a potentiometer comprising a slidewire resistor 13 energized from a suitable source of supply, such as a battery 14 by way of a rheostat 15. The detector 12 is preferably of the electronic type and such as shown in Williams Patent 2,113,164. This detector operates to adjust the movable contact 13a of slidewire 13 to maintain in balance the measuring circuit. Thus as the magnitude of the voltage $E_x$ changes, so does the position of contact 13a on slidewire 13. Besides the mechanical connection to the contact 13a as indicated by the broken line, there is also a mechanical connection, as indicated by the broken line 16, to a pen-index 17 of an exhibiting means which includes a scale 18 and a chart 19 arranged to be periodically driven by a chart-driving motor 20. As the magnitude of the voltage $E_x$ changes in one direction or the other, the pen-index 17 will be driven in one direction or the other to indicate on the scale 18 its instantaneous magnitude and to record that magnitude on the chart 19.

The detector 12, through a mechanical connection 22, relatively adjusts a slidewire 23 and its associated contact 23a energized from a constant voltage source 24 to produce, for an integrating system now to be described, an input voltage $E_D$ proportional to the voltage $E_x$. Thus the measuring system produces a first voltage output which is the input to the integrating system.

The integrating means may be of the type disclosed in Davis et al. Patent 2,830,245. As shown, the integrating system comprises an integrating resistor 25 (which corresponds with the reset resistor of said patent) and an amplifier 26 having a modulating means shown in the form of a vibrator 27 included in its input circuit. The movable contacts of the vibrator 27 is driven by an operating coil 28 alternately to engage first one stationary contact and then to engage the other stationary contact of the vibrator. The amplifier 26 includes in its output circuit a converter 29, such for example, as illustrated in FIG. 4 of said Davis et al. patent, in order to produce across output conductors 30 and 31 a direct current output which increases when the alternating current input (produced by vibrator 27) is of one phase and decreases when that input is of opposite phase. The conductors 30 and 31 correspond with the connection in FIG. 4 of said Davis et al. patent leading to the cathode of the tube 91 and to the conductor 50 of that patent. Phase-sensitive converters which produce direct current outputs may take various forms, and a further example of a suitable system may be found in FIG. 1 of McAdam et al. Patent 2,901,563.

With slidewire contact 23a in its illustrated position, it will be understood there is an output from amplifier 26 and its converter 29. The polarity is such that current flows from one side of converter 29 by way of conductor 30, an integrating capacitor 32, an integrating resistor 25, contacts 33, the lower fractional part of the slidewire 23, and by way of conductors 34 and 31 to the other side of the converter 29. The potential difference developed by the current flowing through integrating resistor 25 opposes the potential difference $E_p$. If these two voltages or potential differences be of unequal value, there will be an input signal to the amplifier 26 which will produce a change in the output in a direction to reduce the difference, approaching zero as a limit. That the described operation takes place will be evident by considering that the movable contact of vibrator 27 first engages its left-hand stationary contact. There will then be applied to the input of amplifier 26 an input signal of polarity and magnitude depending upon the direction and magnitude of the difference between the voltage $E_p$ and the potential difference developed across the integrating resistor 25. Thus, this input signal will be of one polarity or of an opposite polarity. When the movable contact 27 engages its right-hand stationary contact, it will be seen the input to the amplifier is shorted, meaning that there is zero signal applied thereto. Thus, zero or ground potential is utilized as a reference signal with which the aforesaid difference-signal is at all times compared.

The periodic operation of the movable contact of vibrator 27 in opening and closing the aforesaid circuits produces an input to the amplifier 26 having an alternating current component of a frequency dependent upon that of the alternating source used for energizing the driving coil of the vibrator 27. As shown, that source has a frequency of sixty cycles per second. The phase of the alternating current will depend on the polarity of the potential difference applied to the input circuit of amplifier 26.

If it now be assumed that the voltage $E_p$ is greater than that developed across the integrating resistor 25, then there will be an increased output from amplifier 26 to increase the unidirectional current flow through integrating resistor 25 to restore the voltage balance in the input circuit to the amplifier 26.

The integrating action takes place by reason of the following considerations. Inasmuch as the current path for the integrating resistor 25 is by way of the integrating capacitor 32, it will be seen that the current flow to the capacitor 32 must be maintained constant if there is to be produced a constant potential difference across the integrating resistor 25. Inasmuch as the capacitor 32 acquires a charge and potential difference of magnitude proportional to the integral with respect to time of the current flowing through it (and hence proportional to the integral with respect to time of the magnitude of the input condition $E_x$), to overcome the increasing charge on capacitor 32, there is developed from the amplifier 26 and the converter 29 an increasing output, an output which increases as long as the voltage $E_p$ has a finite value greater than zero and at a rate depending upon the magnitude of the voltage $E_p$.

Included in the output circuit of the converter 29 are branch circuits, one including a resistor 36 and the other including a resistor 37 in series with a slidewire 38 having a manually adjustable contact 38a.

It will be recalled that at balance, the point 40 is brought to the same potential (to a very close approximation) as the conductor 34. Accordingly, it will be seen that the potential difference at balance across the resistor 36 will be equal and opposite to the potential difference across the capacitor 32. The resistance means including the resistor 37 and the slidewire 38 is provided in order that there may be derived therefrom a fractional part of a voltage equal to that across capacitor 32 for application to the input of the measuring system. This fractional voltage $E_i$ is proportional to the integral with respect to time of the applied input signal $E_x$. The manner in which the magnitude of the integrated output signal is measured and recorded will now be described.

During the operations which have just been described, a timing motor 41 energized from a suitable source of supply has been effective in rotating a series of control cams 42–45 inclusive in a counterclockwise direction. After a predetermined time interval and corresponding with the time over which the magnitude of the condition $E_x$ is to be integrated, a trough of cam 42 arrives in registry with a cam follower 46 for operation of switch contacts 47 and 48 from their uppermost to their lowermost positions to interrupt the circuit from the input terminals 10 and 11 and to complete a circuit from output conductors 49 and 50 from the integrator to the input conductors 51 and 52 of the measuring system.

Concurrently with, and preferably just in advance of, the operation of the switch contacts 47 and 48, the trough of cam 44 arrives in registry with a cam follower 53 for the opening of switch contacts 33 an instant ahead of the operation of the contacts 47 and 48. The effect of opening the switch contacts 33 is to disconnect the output of the measuring means from the input circuit of the integrating means. With the contacts 33 open, the point 40 is still maintained at or very close to ground potential by the action of the amplifier 26. This action will maintain the voltage across resistor 36 equal and opposite to the voltage across the capacitor 32 during the time that the contacts 33 are open. Thus the integrator can store an integrated value for a period of time so that the value can be read out at the operator's convenience. Thereafter, or concurrently therewith, the contacts 47 and 48 connect the output of the integrating means to the input of the measuring system. Since the voltage $E_i$ is proportional to the charge on the integrating capacitor 32, the measuring system will now be effective to measure the time integral of the voltage $E_x$ over the period of time during which integration took place. Thus, the detector 12 responds to the voltage $E_i$ and the contact 13a is moved to a circuit-balancing position, and through the driving connection 16 the pen-index 17 is moved to a position corresponding with the integrated value, $E_i$, of the condition as represented by the voltage $E_x$. This integrated value is exhibited on the scale 18.

To provide a distinctive indication on the chart 19, a crest is provided on the cam 43 which is arranged to close the motor control switch 21 shortly after the operation of the switches by cams 42 and 44, as above described. With motor 20 energized, the chart is rotated in a downward direction to produce, by the chart-marker or the pen portion of the pen-index 17, a line in the direction of travel of the chart. Such a line is shown at 19a. Another such line is shown at 19b. It will be noted that the line 19b appears to the left of the end of the horizontal line just beneath it and for the following reasons.

In the integration of the magnitude of a condition having the characteristic of a high amplitude which lasts for a short interval of time, the peak value of the voltage $E_x$ will exceed the integrated value represented by the voltage $E_i$. Thus on the chart 19 there will be recorded all peak values which exceed in magnitude the time integral of the condition over the period of time during which the integration takes place. In this connection, it is to be understood that by increasing the magnitude of $E_i$, as by suitable adjustment of the contact 38a, all integrated values may be made to exceed the peak values as appearing on the chart 19, but without the respective measurements departing from true proportionality in respect to the magnitudes of the condition under measurement and with respect to the time integrals of such conditions.

The timing cams 42 and 44 maintain the contacts 47 and 48 in their lowermost position and the switch contacts 33 open until the motor 20 has been energized for a length of time adequate to produce the distinctive indications on the chart 19. Thereafter the cam 45 closes a switch 54 to short-circuit the capacitor 32 wholly to discharge it, a cam follower 55 being associated with cam 45 for the operation of switch 54. Thereafter, the cams 42–45 operate to restore the parts to their illustrated positions. The applied voltage $E_x$ is immediately detected by the detector 12 which functions through contact 13a to rebalance the measuring circuit and to set the contact 23a to develop the input voltage $E_p$ for the integrating means. The integrating means then operates in the manner described above to initiate the charging of the capacitor 32 and for the development of the output signal $E_i$ from the integrating means preparatory to the next operation of the circuit controlling switches 21, 33, 47, 48 and 54.

If it be desired to integrate the quantity $E_x$ over more than one cycle of operation as determined by the motor 41 and its associated cams, a switch 56 in series with the switch 54 may be opened so that the capacitor 32 will not be discharged at the end of the first cycle. If after the crest of cam 45 has passed the cam follower 55, the switch 56 be closed, the output $E_i$ of the integrating means will then be representative of the integrated quantity $E_x$ over two time cycles. Obviously, the integration may take place over any selected number of consecutive time cycles. By timed opening and closing of switch 61 integrations over selected time cycles may be omitted.

For convenience, the integration interval has been described as taken in respect to time, the timing motor 41 providing the time-parameter. If the integration interval be desired in respect to a different quantity, the cams 42–45 will be operated by a driving means energized under the control of that quantity. For example, a switch 57 in series with the motor 41 will be opened and closed by a control means 58 responsive to the quantity in respect to which the integration interval is to take place.

With the above understanding of the invention, it is to be understood that modifications may be made in various parts of the system and that some features may be utilized without other features, it being the intent to cover such modifications and reasonable equivalents by the appended claims.

What is claimed is:

1. A measuring and integrating apparatus comprising a measuring system having an output circuit and an input circuit, switching means for applying an input signal to said input circuit proportional to the magnitude of a condition for producing at said output circuit a first output of magnitude proportional to the magnitude of said condition, integrating means having an output circuit and an input circuit connected to said output circuit of said measuring system for integrating with respect to time said first output and for producing at said output circuit of said integrating means a second output proportional to the integral with respect to time of said first output, and means for operating said switching means for disconnecting said integrating means from said output circuit of said measuring system and for connecting said output circuit of said integrating means to said input circuit of said measuring system in place of the input responsive to the magnitude of said condition for establishing a magnitude of the output from measuring system proportional to the integral with respect to time of said magnitude of said condition.

2. The measuring and integrating apparatus of claim 1 in which said measuring system includes a voltage detector and a potentiometer adjustable by said detector for maintaining said measuring system in balance with change in the magnitude of said condition, and means operable by said detector for indicating instantaneous magnitudes of said condition.

3. The measuring and integrating apparatus of claim 2 in which there is provided a voltage-developing means, means operable by said detector for adjusting said voltage-developing means for producing as a voltage said first output of magnitude proportional to the magnitude of said condition, said integrating means including an integrating resistor and an integrating capacitor for producing as a voltage said second output proportional to the integral with respect to time of said first output voltage.

4. The measuring and integrating apparatus of claim 3 in which said integrating means includes amplifying means having a direct current output for supplying current to said integrating capacitor through a circuit including said integrating resistor for producing in the input to said amplifying means a voltage balance.

5. The measuring and integrating apparatus of claim 4 in which said amplifying means has an input circuit and in which said switching means for disconnecting said integrating means includes a switch for interrupting the circuit between said voltage-developing means and said capacitor without interrupting connections of said capacitor to said input circuit of said amplifying means, whereby said second output will be proportional to the magnitude of the potential difference across said integrating capacitor.

6. The measuring and integrating apparatus of claim 1 in which there is provided means for modifying the operation of said switching means for varying the time interval over which integration of said first output takes place.

7. The measuring and integrating apparatus of claim 1 in which there is provided means for resetting to zero said integrating means after operation of said switching means to apply said second output as the input to said measuring system.

8. The measuring and integrating apparatus of claim 1 in which there is associated with said measuring system an exhibiting instrument having a chart, a marker for said chart, means operable under the control of said measuring system for relatively moving said marker and said chart for producing a record on said chart of the magnitude of said condition, and means operable in timed relation with said switching means for relatively moving said chart and said marker in a different direction for producing a distinctive mark on said chart in position indicative of the magnitude of said second output.

9. A measuring and integrating apparatus comprising a measuring system having an output circuit and an input circuit, switching means for applying an input signal to said input circuit proportional to the magnitude of a condition, said measuring system including a detector and potentiometer means for producing at said output circuit a first voltage output of magnitude proportional to the magnitude of said condition, integrating means having an output circuit and an input circuit connected to said output circuit of said measuring system for integrating with respect to time said first output and for producing at said output circuit of said integrating means a second output proportional to the integral with respect to time of said first output, said integrating means including an integrating resistor, an integrating capacitor, voltage-dividing resistance means and an amplifier of the chopper type responsive to the difference between said first voltage output and the potential difference developed across said integrating resistor, a phase-sensitive converter having an output circuit and an input circuit connected to the output of said amplifier for producing a direct current output, said integrating resistor and said integrating capacitor being connected in series circuit relation with said output circuit of said converter and with said output circuit of said measuring system, said resistance means being connected across said output circuit of said integrating means, and means for operating said switching means for disconnecting said integrating means from said output circuit of said measuring system and for connecting the output circuit of said integrating means to said input circuit of said measuring system in place of the input responsive to the magnitude of said condition for applying at least a fractional part of the voltage developed across said resistance means to the input of said detector for establishing a voltage output from said measuring system proportional to the magnitude of the voltage derived from said resistance means thereby to provide a measurement of the integral with respect to time of said magnitude of said condition.

10. A measuring and integrating apparatus comprising a measuring circuit having input terminals for application thereto of a voltage which varies in accordance with the magnitude of a condition, said measuring system including a detector and potentiometer means for producing a voltage balancing that of the applied voltage and for producing a first output voltage of magnitude proportional to the magnitude of said condition, integrating means including an amplifier having an input circuit, modulating means included in said input circuit, a phase-sensitive converter connected to the output of said amplifier for producing a direct current output, an integrating resistor and an integrating capacitor in series-circuit relation with said output of said converter, means including said modulating means for applying to said amplifier the difference between said first output voltage and the potential difference developed across said integrating resistor for applying a signal having an alternating current component of phase and of amplitude dependent upon the direction and magnitude of said difference, resistance means connected across said output of said converter for developing a potential difference, an output circuit from said integrating means derived from said resistance means, switching means for disconnecting said integrating means from said measuring system, whereby said direct current output produces a potential difference across said resistance means equal and opposite to that across said integrating capacitor, and means for interrupting the circuit from said input terminals to said detector and for establishing connections from the output circuit of said integrating means to said detector as the input to said measuring system thereby to produce a magnitude of said first output voltage proportional to the integral with respect to time of the magnitude of said condition.

11. The measuring and integrating apparatus of claim 10 in which there is associated with said detector an exhibiting means having a chart, driving means for the chart, a marker for producing a record on said chart for indication of the instantaneous magnitudes of said condition during the period of integration thereof, and timing means for establishing the time over which said magnitude of said condition is integrated for controlling the operation of said switching means and for controlling the operation of said driving means for said chart to move said chart relative to said marker.

12. The combination with a measuring system for measuring the magnitude of a condition and for producing an output voltage of magnitude proportional to the magnitude of a condition, of integrating means having an input circuit to wihch said output voltage is applied, an integrating resistor in series-circuit relation in said input circuit, an amplifier having an output circuit and an input including said input circuit for application thereto of the difference between said output voltage and the potential difference developed across said integrating resistor, said amplifier including output means for producing flow of a direct current through said output circuit which increases or decreases when said difference voltage applied to its input is of one polarity or of an opposite polarity, an integrating capacitor connected in series-circuit relation in said output circuit of said amplifier and in series-circuit relation with said integrating resistor, the amplifier output current flowing through said integrating resistor having a magnitude which develops said potential difference balancing said measuring system output voltage, voltage-dividing resistance means connected across said amplifier output circuit for developing a potential difference, switching means for connecting the input of said amplifier to be responsive solely to the difference in the potential acquired by said integrating capacitor and that developed by said voltage-dividing resistance means, said amplifier regulating the current flow through said resistance means to produce a potential difference equal and opposite to that across said integrating capacitor whereby measurement of a potential difference developed by said resistance means will be proportional to the potential difference across said integrating capacitor, and means for applying at least a fraction of said last-named potential difference as the sole input to said measuring system for the measurement of the magnitude of the integral with respect to time of said magnitude of said condition.

13. The combination of claim 12 in which said measuring system includes a voltage detector and a potentiometer adjustable by said detector for maintaining said measuring system in balance with change in the magnitude of said condition.

14. The combination of claim 12 in which there is provided means for modifying the operation of said switching means for varying the time interval over which the amplifier output current flows through said integrating capacitor.

15. The combination of claim 12 in which there is associated with said measuring system a recorder having a chart, a marker and driving means for said chart, means operable under the control of said measuring system for moving said marker for producing a record on said chart of the magnitude of said condition and of the magnitude of the integral with respect to time of said magnitude of said condition, and timing means for controlling the operation of said switching means.

16. The combination of claim 15 in which means are provided to control said driving means for said chart for movement of said chart only during the said production of one of said records on said chart.

17. A measuring and integrating apparatus comprising a measuring system responsive to the magnitude of a condition for producing a first output of magnitude proportional to the magnitude of said condition, integrating means having an input circuit, means operable under the control of said measuring system for developing across said input circuit an input voltage proportional to the magnitude of said condition, said integrating means comprising means including an amplifier for producing in its output circuit a direct current of magnitude which increases when the input to said amplifier is of one polarity and decreases when the input to said amplifier is of opposite polarity, an integrating capacitor and an integrating resistor in series-circuit relation with said output circuit of said amplifier and in said input circuit, a connection from one side of said input of said amplifier extending to the junction between said integrating resistor and said integrating capacitor, and a second connection for the other side of said input extending to the side of the output circuit of said amplifier remote from said integrating capacitor for application to said amplifier of the difference-potential between said input voltage and the potential difference developed across said integrating resistor by reason of current flow therethrough from said amplifier by way of said integrating capacitor whereby said output current from said amplifier will charge said integrating capacitor to a potential proportional to the integral with respect to time of said magnitude of said condition, voltage-dividing resistance means connected across the output of said amplifier, switching means for disconnecting from said input circuit said input voltage for development in said input of said amplifier of a potential difference representing the difference between that across said integrating capacitor and that developed by said resistance means, and means including said switching means for applying as the sole input to said measuring system a potential difference derived from said resistance means for operation of said measuring system to produce an output proportional to the magnitude of the integral with respect to time of said magnitude of said condition.

References Cited in the file of this patent

UNITED STATES PATENTS

| | | |
|---|---|---|
| 2,359,767 | Keinath | Oct. 10, 1944 |
| 2,366,913 | Le Clair | Jan. 9, 1945 |
| 2,575,711 | Hipple | Nov. 20, 1951 |
| 2,577,735 | Broomell | Dec. 11, 1951 |
| 2,663,855 | Beggs | Dec. 22, 1953 |

OTHER REFERENCES

Publication: "A Combined Current Indicator and Integrator," on pages 688–690 of "The Review of Scientific Instruments," vol. 22, No. 9, Sept. 1951.